(12) United States Patent
Leung et al.

(10) Patent No.: US 8,107,200 B2
(45) Date of Patent: Jan. 31, 2012

(54) ESD, CROSS TALK AND NOISE MINIMIZING RESISTIVE/CAPACITATIVE SHUNT FOR CPP AND TMR DEVICES

(75) Inventors: Eric Cheuk Wing Leung, Kowloon (HK); Anthony Wai Yuen Lai, Tokwawan (HK); Pak Kin Wong, Tsuen Wan (HK); David Hu, Los Altos, CA (US); Moris Dovek, San Jose, CA (US); Rod Lee, San Jose, CA (US)

(73) Assignees: Headway Technologies, Inc., Milpitas, CA (US); SAE Magnetics (HK) Ltd., Shatin N.T. (HK)

( * ) Notice: Subject to any disclaimer, the term of this patent is extended or adjusted under 35 U.S.C. 154(b) by 816 days.

(21) Appl. No.: 12/214,504

(22) Filed: Jun. 19, 2008

(65) Prior Publication Data

US 2008/0259506 A1    Oct. 23, 2008

Related U.S. Application Data

(62) Division of application No. 11/074,251, filed on Mar. 7, 2005, now Pat. No. 7,392,579.

(51) Int. Cl.
*G11B 5/39* (2006.01)
(52) U.S. Cl. ....................................................... 360/323
(58) Field of Classification Search .................... 360/323
See application file for complete search history.

(56) References Cited

U.S. PATENT DOCUMENTS

| | | | |
|---|---|---|---|
| 5,539,598 A | 7/1996 | Denison et al. | |
| 6,219,205 B1 | 4/2001 | Yuan et al. | |
| 6,373,660 B1 | 4/2002 | Lam | |
| 6,627,932 B1 | 9/2003 | Drewes | |
| 6,671,137 B2 * | 12/2003 | Ajiki et al. | 360/323 |
| 6,728,082 B2 | 4/2004 | Tabat et al. | |
| 6,760,199 B2 * | 7/2004 | Biskeborn | 360/323 |
| 7,542,245 B2 | 6/2009 | Kagami et al. | |

* cited by examiner

*Primary Examiner* — Allen Heinz
(74) *Attorney, Agent, or Firm* — Saile Ackerman LLC; Stephen B. Ackerman

(57) ABSTRACT

A slider mounted CPP GMR or TMR read head sensor is protected from electrostatic discharge (ESD) damage and from noise and cross-talk from an adjacent write head by means of a balanced resistive/capacitative shunt. The shunt includes highly resistive interconnections between upper and lower shields of the read head and a grounded slider substrate and a low resistance interconnection between the lower pole piece of the write head and the substrate. The capacitances between the pole piece and the upper shield, the upper shield and the lower shield and the lower shield and the substrate are made equal by either forming the shields and pole piece with equal surface areas and separating them with dielectrics of equal thicknesses, or by keeping the ratio of area to insulator thicknesses equal.

4 Claims, 5 Drawing Sheets

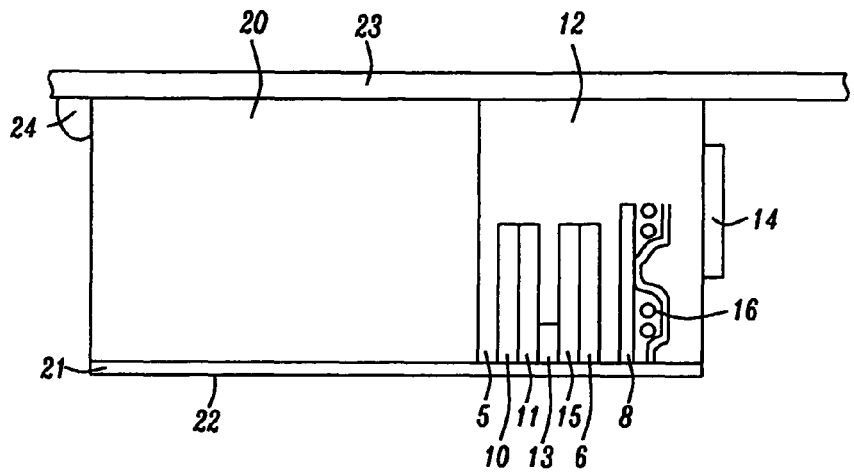
FIG. 1 - Prior Art
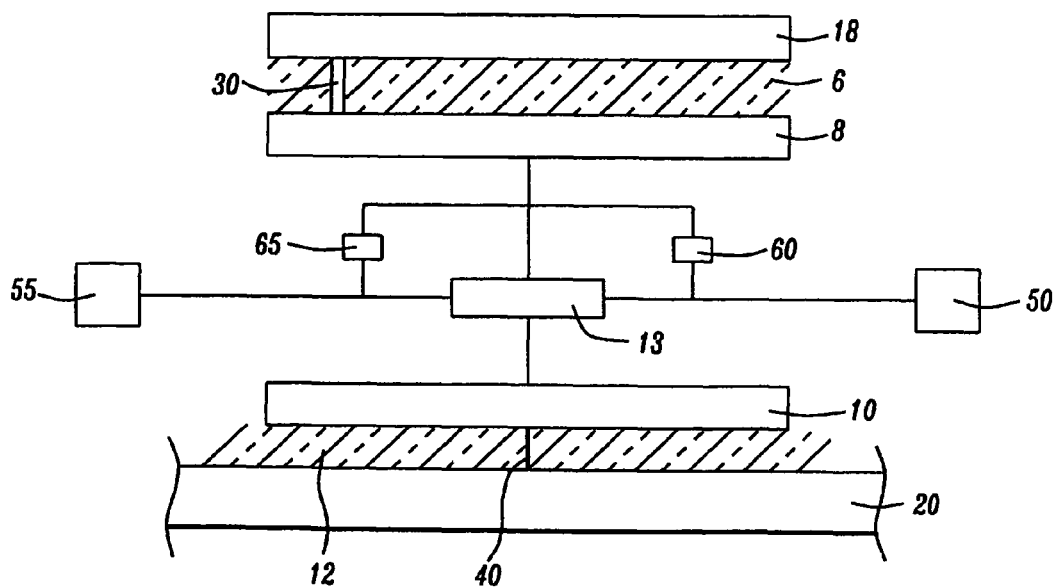
FIG. 2 - Prior Art

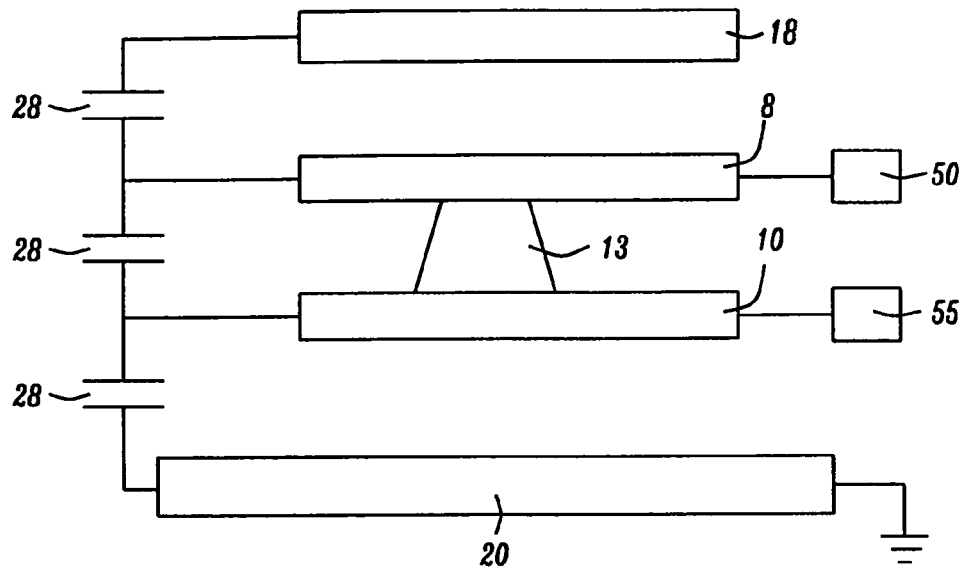
FIG. 3 – Prior Art
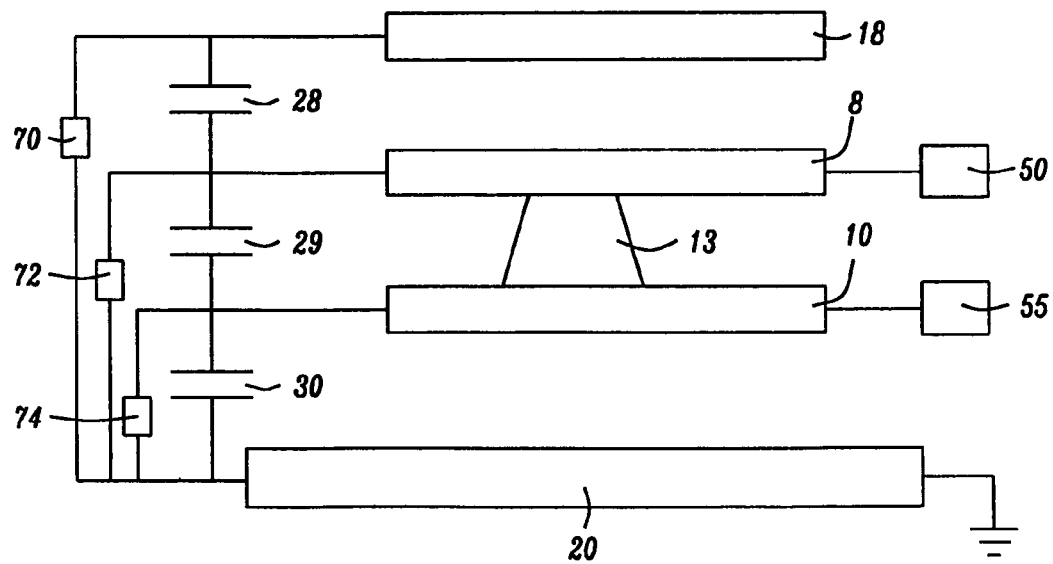
FIG. 4

ESD, CROSS TALK AND NOISE MINIMIZING RESISTIVE/CAPACITATIVE SHUNT FOR CPP AND TMR DEVICES

This is a Divisional application of U.S. patent application Ser. No. 11/074,251, filed on Mar. 7, 2005, now issued as U.S. Pat. No. 7,392,579, which is herein incorporated by reference in its entirety, and assigned to a common assignee.

BACKGROUND OF THE INVENTION

1. Field of the Invention

This invention relates generally to magnetic read and write-heads and more particularly to a method of eliminating electrostatic discharge (ESD), cross-talk and noise during their operation.

2. Description of the Related Art

A magnetic data recording hard disk drive employs a plurality of electromagnetic transducers, a typical one of the prior art being schematically shown in FIG. 1. In a state-of-the-art disk drive, each transducer (1) further consists of a read-head (2) and a write-head (4). The shielded read head (2) typically includes a sensor (13) whose operation is based on the giant magnetoresistive (GMR) effect and it is extremely sensitive to electrostatic discharge (ESD). As we shall discuss below, three different configurations of sensors are in use, the current-in-plane (CIP) configuration, the current-perpendicular-to-plane (CPP) configuration and the tunneling magnetoresistive (TMR) configuration.

The write-head (4) is typically an inductive coil (coil cross-sections shown as (16)), which is fairly immune to ESD. The read head is typically protected from stray electromagnetic fields during operation by an upper shield (8) and an under-shield (10). The lower pole of the write head (18) can also serve to insulate the read head from noise produced by the write head. If the read head is a CIP head, a first dielectric layer, $D_1$ (11) insulates the under-shield from the CIP element (13), and second dielectric layer, $D_2$ (15) insulates the element from the upper shield (8). In the CIP configuration, the sense current for the read head is introduced on the lateral sides of the read head. In the CPP or TMR configurations, in both of which the sense current is introduced through the top and bottom surfaces, the shields may be formed directly contacting the upper and lower surfaces of the element and may actually serve as electrodes to introduce and extract the sense current. The dielectric layers $D_1$ and $D_2$ would be absent in the CPP or TMR configuration.

The shields, dielectric layers and GMR sensor structure are sequentially formed on a substrate (20), also called a slider substrate. The combined read/write-head (transducer) is typically encapsulated in an alumina deposit (12) and conducting leads (not shown) pass through the encapsulation and are connected to conducting pads on a terminal strip (14) on its surface. An undercoating layer of alumina (5) separates the lower surface of the lower shield (10) from the substrate (20) and a dielectric spacer layer typically formed of the alumina encapsuation material (6) separates the upper surface of the upper shield (8) from the lower surface of the write head pole (18). In the present invention the thicknesses of these layers will be important in determining coupling capacitances between the shields and the substrate.

The slider substrate (20) basically forms a wear-resistant ceramic carrier for the transducers (1). The write head's magnetic poles (18) and the read head's GMR sensor element (13), emerge at a surface of their encapsulating alumina deposit (12) which is co-planar with the surface (22) of the slider substrate, called its air-bearing surface (ABS). The surface of the slider is commonly protected by a highly wear-resistant carbon overcoat (COC) (21). As is shown further, each slider substrate (20) is mounted on a stainless steel suspension (23) using a conductive adhesive (24), the combination of (20) and (23) forming a head-gimbals assembly (HGA). The conducting adhesive electrically connects the slider to the suspension and to ground.

The read head ((2) in FIG. 1) may be formed in any of several GMR configurations. A common configuration is the current-in-plane (CIP) configuration, in which the sense current is injected at lateral edges of the sensor and flows along the direction of the planar surfaces of the magnetic layers. Another configuration is the current-perpendicular-to-plane (CPP) configuration, in which the sense current is injected through the upper surface of the sensor in a direction perpendicular to the planar surfaces of the magnetic layers. Yet another read head variation is the tunneling magnetoresistive (TMR) device, in which the active magnetic layers are separated by a dielectric layer sufficiently thin so as to allow a tunneling current to pass.

GMR devices are susceptible to noise, cross-talk from the write head and electrostatic discharge damage (ESD). The cross-talk is a result of the closeness of the write and read heads and the ESD damage is a result of the thinness of the read head layers. To protect the device from such discharge, a mechanism is required that will bleed accumulated charge from the sensor and its surrounding elements before the accumulated amount is sufficient to initiate the discharge. Referring to prior art FIG. 2, there is shown a schematic illustration of an ABS plane view of a GMR sensor of CIP configuration (13) positioned between an upper shield (8) and a lower shield (10) and separated from the slider substrate (20) by insulation (12). Rectangular boxes (50, 55) symbolize sensor current input and output to the lateral edges of the sensor in accord with its CIP configuration. A lower pole (18) of an inductive write head is shown above the upper shield and is also insulated from the shield by a dielectric layer (6). A connection (30) between the lower pole and upper shield allows charge drainage from pole to shield. A connection (40) from lower shield to substrate, which is itself grounded to the suspension (not shown), contains a resistance of approximately 20 kOhm. The upper shield is directly connected to the lower shields which are connected to each side of the CIP sensor through resistances (60,65) of approximately 2 kOhm each. The shields can discharge to the substrate or the suspension or when connected to the read head preamplifier. This configuration is found to provide adequate ESD protection to the CIP GMR sensor as shown.

CPP GMR sensors and TMR sensors also need a current drainage path to prevent ESD, but the arrangement of FIG. 2 would not be appropriate. If the sensor (13) of FIG. 2 were a CPP configured sensor, the upper and lower shields (8,10) would actually be in electrical contact with the current input (and output) ends of the sensor, which are its upper and lower surfaces. Thus, the two resistors (60,65) would be in parallel with the actual read element, whose resistance ranges from 50 Ohms (CPP) to 1000 Ohms (TMR). This would either force most of the draining charges through the sensor, or would shunt the read-back signal from the sensor through the resistors and away from the read-back circuitry. Neither of these are desirable results.

Referring to prior art FIG. 3, there is shown the equivalent schematic circuitry associated with a CPP GMR or TMR type read head. There is no ESD preventative circuitry shown in this figure because, as noted above, circuitry analogous to that in FIG. 2 would be inappropriate. The sensor element (13) is between upper and lower shields (8, 10) which receive sense current from input and output (50,55), the current passing vertically between upper and lower shields. As is further indicated in the figure, capacitative coupling (28) exists between the lower write head pole (18), the upper and lower shields (8,10) and the slider substrate (20), which produces an undesirable degree of cross-talk between the write head and the read head and between the substrate and read head. This capacitative coupling is a result of the planar shields, pole and the dielectric insulative material between them and the slider substrate. This capacitative coupling is much less of a problem for the CIP configuration of FIG. 3 because of the symmetric and balanced configuration of the CIP leads. In the CPP configuration the capacitance between the pole and the first lead is different than that between the pole and the second lead. Similarly, the capacitance between the substrate and the first lead is different than that between the substrate and the second lead. In the CPP structure all the capacitances to the first and second leads are similar due to the way the structure is laid out.

The prior art teaches several approaches for eliminating ESD in both disk drives and tape drives that incorporate GMR and MR read sensors. Of particular note is Tabat et al. (U.S. Pat. No. 6,728,082) who teaches a magnetoresistive transducer that includes at least one bleed resistor that couples the assembly to a substrate. While Tabat does not specifically note the GMR configuration of the sensor, he shows a sensor shield connected by a high resistance to a substrate. Tabat does not mention the associated problem of capacitative coupling induced noise and cross-talk between the read head and write head, although he notes the fact that the read head shields couple capacitatively to the substrate. Neither does Tabat teach a shunting scheme that eliminates noise and cross-talk caused by capacitative coupling between the read head and write head at the same time it eliminates ESD.

Lam et al. (U.S. Pat. No. 6,373,660) teach a method for protecting an MR read head from electrostatic discharge by connecting a resistor between various connection pads incorporated within the head gimbal assembly.

Denison et al. (U.S. Pat. No. 5,539,598) discloses a magnetoresistive head for reading a tape that is protected from ESD by a resistive connection between a shield and a ground. Unlike the present invention, there is no associated write head and no capacitative coupling between the head and its surroundings.

Yuan et al. (U.S. Pat. No. 6,219,205) teaches the protection of a read head sensor by recessing it from the surface to be read by a dielectric layer. The method is, therefore, mechanical rather than electrical.

Unlike the prior art cited above, the present invention proposes a resistive/capacitative shunting scheme for slowly bleeding off accumulated electrostatic charge on shields surrounding a CPP GMR and TMR sensor and from the pole structures of an adjacent magnetic write head. In addition, by combining shunting resistors with a proper choice of capacitative coupling between the shields, pole piece and substrate, the combined resistive/capacitative shunting scheme will also alleviate the problem of noise and cross-talk produced by capacitative coupling between the shields, pole and substrate that otherwise exists without the shunting scheme of the present invention.

SUMMARY OF THE INVENTION

A first object of this invention is to provide a method for suppressing ESD damage to a CPP configured GMR read head or a TMR read head due to the generation and discharge of accumulated static charge through said GMR read head during the construction or operation of the head-disk assembly or its various sub-components.

It is a second object of this invention to provide such suppression by use of a resistive/capacitative shunt configuration that slowly bleeds electrostatic charge from the read head shields and the write head poles surrounding the read head to a grounded substrate.

It is a third object of this invention to provide such a resistive/capacitative shunt configuration and suppression method that also eliminates noise in the read back signal and cross-talk between the read head and an associated write head that is caused by capacitative coupling between poles, shields and substrate.

It is a fourth object of the present invention to provide such a suppression method that is cost effective and easily integrated within the present methods of read-head, write-head and disk drive assembly manufacture.

The objects of this invention will achieved by the resistive/capacitative shunt arrangement that is schematically illustrated in FIG. 4 and further shown in constructed form in FIGS. 5A and 5B. A preferred method of construction of the shunt is illustrated in FIGS. 6A-6C. The resistive connections formed within the shunt described herein allows accumulated static charge to bleed slowly to a slider substrate from the shields surrounding a CPP GMR or TMR sensor. The balanced capacitative connections, formed by adjusting the planar dimensions of the shields and the thickness of the dielectric layers between them so that the capacitances are equal, will insure that noise and cross-talk are eliminated as a result of common mode rejection by the read-back preamplifier.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figures, wherein:

FIG. 1 (Prior Art) is a schematic cross-sectional view of a slider-mounted transducer.

FIG. 2 (Prior Art) is a schematic ABS plane view of a CIP read sensor shunted to suppress ESD.

FIG. 3 (Prior Art) is a schematic ABS plane view of an unshunted CPP or TMR read sensor.

FIG. 4 is a schematic ABS plane view of a CPP or TMR read sensor (as in FIG. 3) shunted in accord with the present invention.

DESCRIPTION OF THE PREFERRED EMBODIMENTS

The preferred embodiment of the present invention provides a method of forming a resistive/capacitative shunt to suppress ESD in a CPP or TMR slider mounted read head sensor while simultaneously preventing noise and cross-talk with an adjacent write head.

Referring now to FIG. 4, there is shown a schematic ABS plane view of a CPP GMR or TMR read sensor, as in FIG. 3, now shunted in accord with the present invention. Low resistance $R_l$ (70) connects the lower pole (18) of the write head, which also serves as an upper shield, to the grounded slider substrate (20). High resistance $R_h$ (72) connects the upper shield (8) (referred to in capacitance subscripts as $S_2$) to the grounded substrate (20). High resistance $R_h$ (74) connects the lower shield (10) (referred to as $S_1$) to the grounded substrate (20). Capacitance $C_{ps2}$ (28) is the capacitance between write head pole (18) and upper shield (8). This capacitance is a result of the surface area of the pole and shield and the thickness of the dielectric alumina layer ((6) in FIG. 1) between them. Capacitance $C_{s1s2}$ (29) is the capacitance between upper shield (8) and lower shield (10), which is a result of the surface areas of these two shields and the thickness of the alumina layer between them (the spacing between (8) and (10) in FIG. 1). Capacitance $C_{s1sub}$ (30) is the capacitance between lower shield (10) and slider substrate (20), a result of the surface area of the lower shield and the thickness of the layer of alumina undercoat between the lower shield and the slider substrate ((5) in FIG. 1). Capacitances $C_{s1s2}$, $C_{ps2}$ and $C_{s1sub}$ also contain additional parasitic elements due to the metal interconnect layout on the substrate. In this preferred embodiment $R_l$ is less than approximately 100 Ohms, $R_h$ is between approximately 1 kOhm and 100 kOhm, with 20 kOhm being a typical value. The substrate can be grounded to the suspension by means of a conducting adhesive (non-linear resistance) such as silver epoxy, or it can be directly connected by means of an additional grounding pad at the terminal strip ((14) on FIG. 1 or 2). Balancing the capacitance, so that $C_{s1sub} = C_{ps2}$, provides noise cancellation by common mode rejection in the input stage of the preamplifier (not shown). This equality of the capacitances can be obtained during fabrication by maintaining the thickness of the undercoat between the lower shield and the substrate ((5) in FIG. 1) equal to the thickness of the alumina spacer layer ((6) in FIG. 1) between the lower pole (18) and the upper shield (8) and by keeping the areas of the upper and lower shields and the lower pole equal or, alternatively, by keeping the ratios of surface area to layer thickness a constant.

Figure 5A:
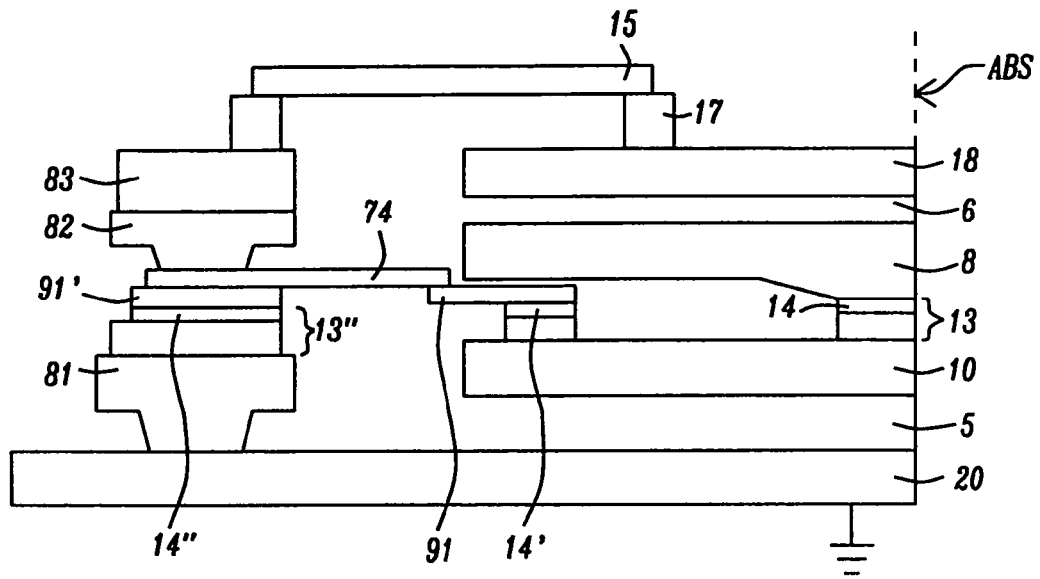
FIGS. 5A and 5B are two schematic cross-sectional views, left (A) and right (B) through a central plane, showing a fully fabricated form of a preferred embodiment of the present invention.
Figure 5B:
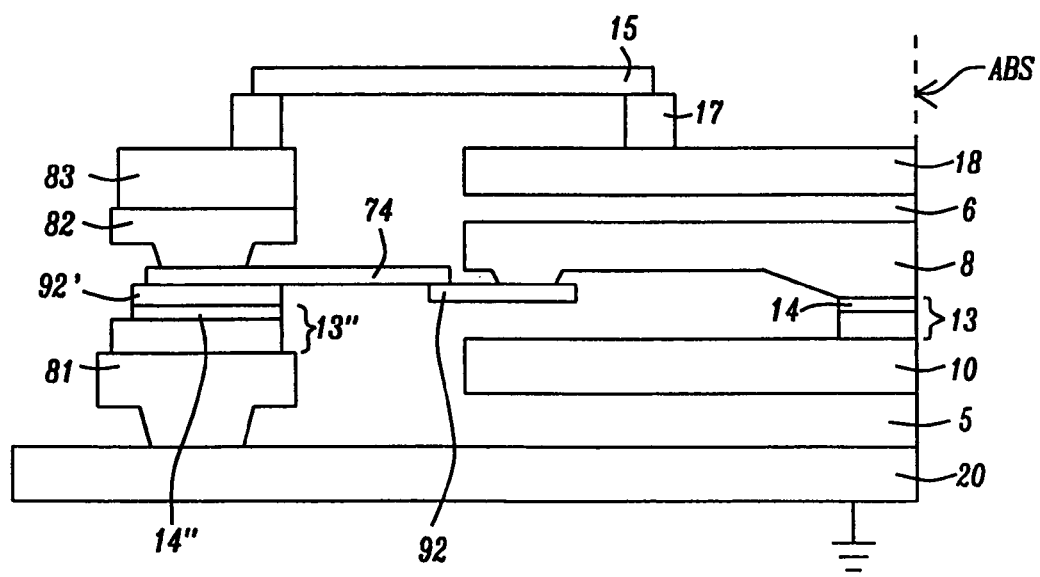

Referring now to FIGS. 5A and 5B there is shown a preferred embodiment of a fabrication that will implement the resistive/capacitive shunt of FIG. 4. The fabrication is shown as two cross-sectional views, A and B, on the right and left sides of a central plane through the fabrication.

Looking at the air-bearing surface (ABS) of either 5A or 5B (shown as a vertical dashed line) there is seen the CPP GMR sensor (13) (alternatively, a TMR sensor) formed between the upper shield (8) and the lower shield (10). A conducting lead layer (14) contacts the upper surface of the sensor. The conducting lead layer provides a means for injecting a sensor current into the sensor and for extracting an output signal from the sensor. Note that differences in current flow through a TMR configuration and a CPP GMR configuration may require different configurations of the lead layers. Note further that the sensor is deposited as a patterned, continuous configuration of layers, so that in the cross-sectional views of these figures, a portion appears as (13) at the ABS, as (13') at the rear of lower shield (10), and as an island (13") on the upper surface of the structure (81) to be described below.

The lower write head pole (18) is shown above the upper shield (8) and is separated from (and insulated from) the upper shield by a deposited and planarized alumina layer (6) of thickness $t_3$ that is formed over the upper shield (8). Note that although alumina is the dielectric material of choice in this embodiment, other dielectric materials of similar properties can be used. For completeness, a stitched upper pole piece (17) and inductive coil structure (15) are also shown schematically.

The lower shield (10) is separated from the substrate (20) by a deposited and planarized alumina layer (5) of thickness $t_1$. The upper shield (8) is separated from the lower shield (10) by a deposited and planarized alumina layer (6) of thickness $t_2$. The pole and two shields extend rearward, away from the ABS plane (22). A conductor filled via (81), extends through the surrounding alumina (19) and contacts the substrate at (79). The region behind the shields (19) is filled with an accumulated alumina deposit that is the result of the separate alumina layer depositions and planarizations that form the layers (5) and (6). In the fabrication process, the upper surfaces of (10) and (81) and the alumina deposited between them (19), are planarized to the same level. The details of the steps involved in producing the fabrication will be explained below with reference to FIGS. 6A and 6B.

Looking further at FIG. 5B, there can be seen an island of the TMR or CPP sensor (13"), which is covered by a conducting lead layer (14"), formed on the upper surface of the conductor filled via (81). A patterned conducting metallization layer (92) and (92'), serves to allow the connection of a high resistance lead (72), having resistance $R_h$, between upper shield (8) and the conducting lead (14") of sensor island (13"). The layer (92') is built up to the correct level by means of the thicknesses of layers incorporated within sensor (13"). The high resistance lead (72) is formed of a high resistivity material, deposited in a serpentine pattern to give it a maximal length and a total resistance $R_h$. Another conductor filled via (82) extends through the surrounding alumina. The upper surface of (82) is planarized to the same level as the upper surface of the upper shield (8). A rear portion of the magnetic lower pole (83) passes through a surrounding alumina deposition and allows the lower magnetic pole to contact the upper surface of via (82). Thus, through (83) and (82) the lower pole (18) is connected to the grounded substrate (20) through a low resistance, $R_l$, which is indicated schematically as (70) in FIG. 4.

Looking now at FIG. 5A, which represents the cross-sectional view across the other side of the central plane, there is shown a conducting metallization layer (91) formed on an upper surface of the sensor (13') formed on the lower shield (10). Another portion (91') is formed on the upper surface of the sensor island (13"). A high resistive lead (74), having the same resistance, $R_h$, as lead (72) and similarly formed to a maximal length by a serpentine deposition, is connected to and extends between the two portions of the metallization layer, (91) and (91'). High resistance leads (72) and (74) thereby shunt the upper and lower shields (8) and (10) to the grounded substrate as depicted schematically in FIG. 4.

Looking again at either 5A or 5B, there is shown, as noted above, a low resistance connection formed by (82) and (83) having resistance $R_l$ and electrically connecting the lower pole (18) of the inductive write head to the substrate (20). It is, therefore, to be noted at this point that the embodiment described above implements the schematic shunting circuitry described in FIG. 4, including equal high resistance connections (72) and (74) between both shields and the substrate and a low resistance connection from the lower pole (18) to the substrate. There are simpler versions of the shunt that would include only the low resistance connection from the pole or only a high resistance connection from one of the shields. It should be clear to one skilled in the art that the formation of such shunts of reduced complexity is a straightforward exercise that involves forming only the resistive connections that are required.

Figure 6A:
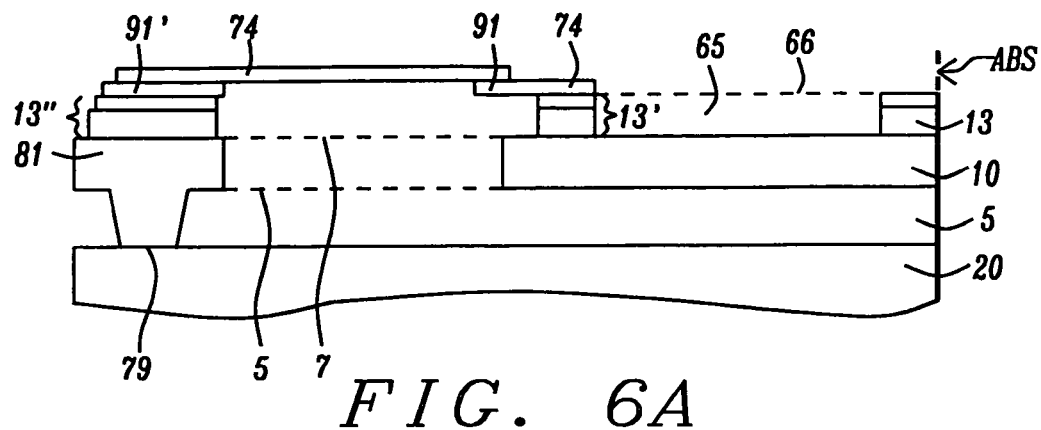
FIGS. 6A-6C are a series of schematic illustrations showing the intermediate steps in fabricating the embodiment illustrated in its completed form in FIGS. 5A and 5B.
Figure 6B:
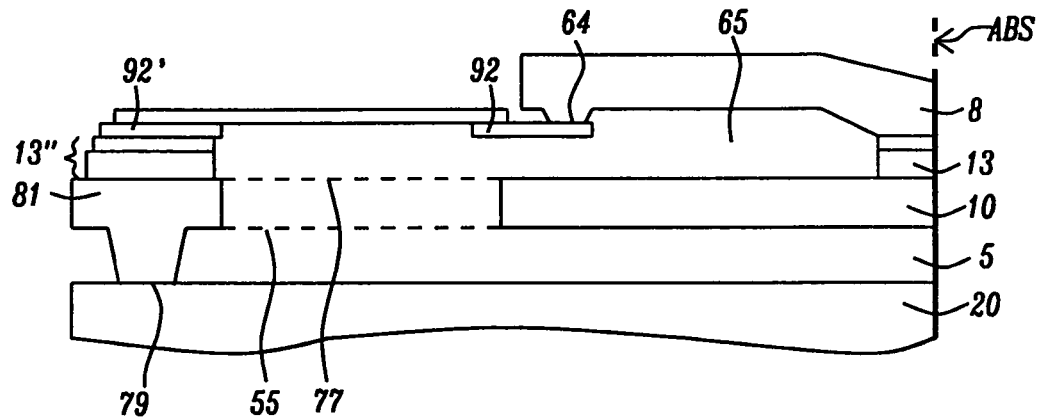

Referring now to FIGS. 6A and 6B, there is shown, across a central plane, an initial step in the formation of the completed fabrication shown in FIGS. 5A and 5B. FIG. 6A shows lower shield (10) formed on the planarized surface (dashed line (55)) of an undercoat dielectric layer (5) having a thickness $t_3$, formed on the substrate (20). A dielectric layer of alumina (7) is then formed surrounding (10) and a conductor filled via (81) is formed through the alumina to contact substrate (20) at surface (79). The lower shield (10), the conductor filled via (81) and the alumina (7) are planarized to the same height (indicated by the dashed horizontal line (77)). A patterned CPP GMR or TMR sensor layer (13), (13') and (13") is formed on the lower shield, so that a portion (13) is at the ABS plane, a second portion (13') is on the rear portion of the shield and a third portion (13") forms an island on (81).

An additional alumina layer (6) is formed over the shield (10) and sensor layer and planarized (dashed line at numeral (66)) to a uniform height so that a metallization layer (91) can be formed upon it and so that the high resistance lead (74) can also be formed between the lower shield and via (81). The high resistance lead will electrically contact via (81) through its connection to another portion of the metallization layer (91') formed on sensor layer portion (13").

Referring to FIG. 6B there is shown a subsequent step in the fabrication by looking at the other side of the formation (across the central plane) wherein now upper shield (8) has been formed over the planarized layer (6) as described in FIG. 6A. A patterned metallization layer (92) had been formed on the layer (6) and is electrically contacted by the upper shield at (64). The metallization layer contacting the shield will then serve to also electrically contact a high resistance lead (72) which, in turn, will electrically contact via (81) through another portion of the metallization layer (92'). The total thickness of the layer (6) separating upper shield (8) from lower shield (10) is $t_2$. An additional layer of alumina (4) is formed over the upper shield and planarized. A conductor filled via (82) is formed through layer (4), forming an electrical connection to the lower via (81). The planarized layer (4) has a thickness of $t_2$ above the upper shield.

Figure 6C:
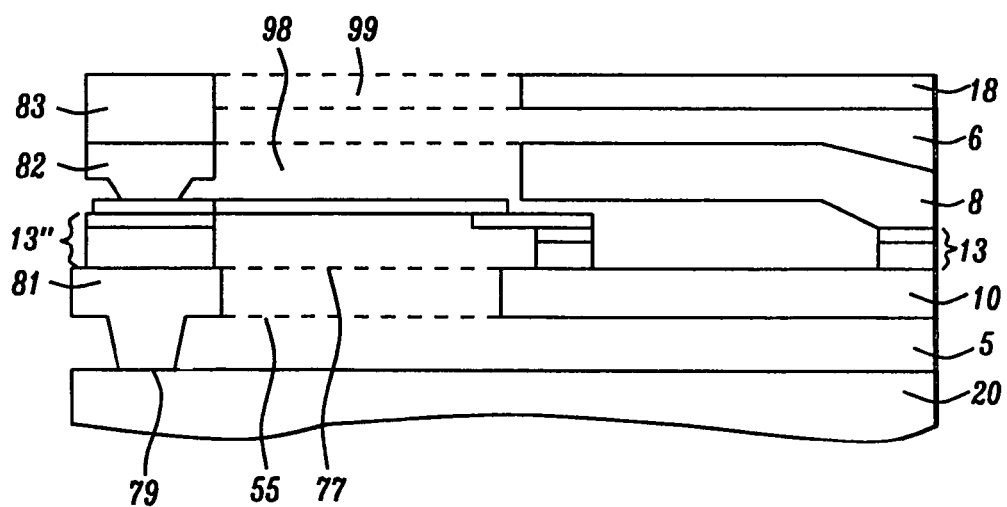

Referring now to FIG. 6C, there can be seen the remainder of fabrication of either 6A or 6B. First, there is the additional formation of alumina layer (98) disposed about upper shield (8) and the formation of conductor filled via (82) through layer (98). Next, the upper surface of (8), (82) and (98) is planarized to form a surface of uniform height. Next, alumina layer (6) is formed on this planar surface and lower pole (18) is formed on (6). Alumina layer (99) is disposed about (18) and an additional and connected portion of the lower pole (83) is formed through layers (98) and (99) to contact the upper surface of via (82). In this way, lower pole (18) forms a low resistance connection through (83), (82) and (81) to substrate (20) as indicated by (70) in FIG. 4

Figure 7:
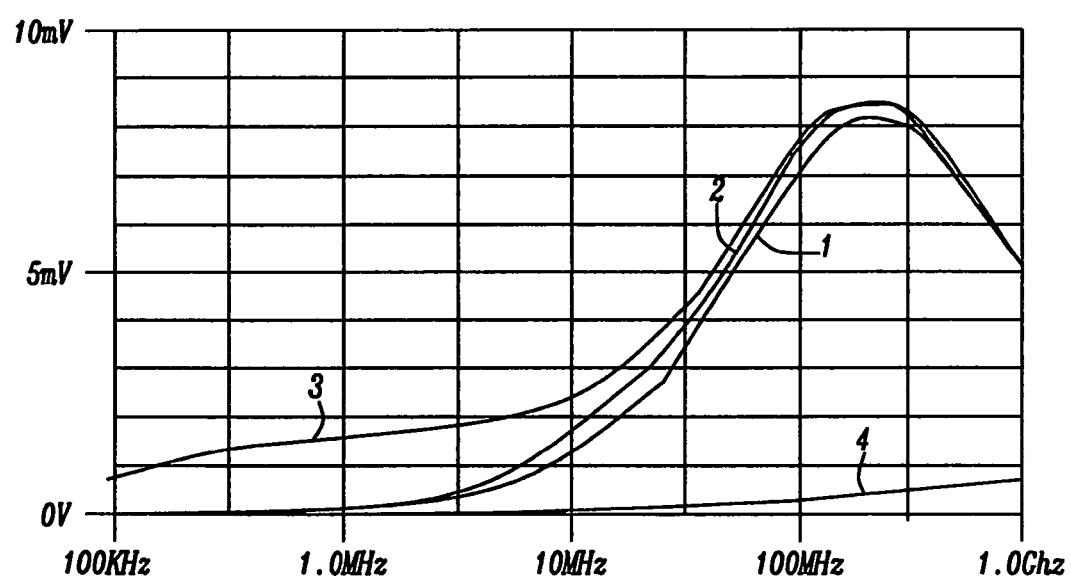
FIG. 7 is graphical evidence of the noise-rejection advantages of the present invention.

The resistive lead construction shown in FIGS. 5A and 5B, together with the shield-to-shield, shield-to-substrate and pole-to-shield capacitances inherent in the structure of planar shields separated by dielectric layers (alumina in the present embodiment) produce both the noise-rejection characteristics and the ESD protection of the resistive/capacitative shunted system graphically illustrated in FIG. 7. By balancing the capacitances between the lower shield and the substrate and between the pole and the upper shield, the construction will achieve the optimal noise and cross-talk rejection that is the object of the invention. It is further noted that the balancing of the capacitances can be obtained either by keeping shield and pole areas identical and separation layer thicknesses identical, or by keeping the area-to-layer thickness ratio balanced (wider area, thicker insulator).

Looking at the graph in FIG. 7, there is seen the advantageous effect of the invention in reducing noise and cross-talk. In this graph, the substrate was driven by a source of noise and the noise pickup in the preamplifier input stage was measured as a function of frequency. Five cases were modeled and the curves are numbered as follows:
(1) Two 20 kOhm shunts (pole not shunted) with capacitative imbalance.
(2) No shunt with capacitative imbalance.
(3) One 20 kOhm shunt between lower shield and substrate.
(4) One 20 kOhm shunt with a 5th terminal pad for grounding substrate.
(5) Balanced capacitances (not shown on the graph).

Case (5) produced no measurable noise pickup and no graph is shown in the figure. As is noted herein, case (5) is achieved by keeping the surface areas of the two shields and the pole equal and by keeping the thickness of the dielectric layer between the lower shield and the substrate (layer (5) in FIG. 7A or FIG. 1) equal to the thickness of the dielectric layer between the pole and upper shield (layer (6) in FIG. 7A or FIG. 1). The graphical traces shown all indicate a noise pickup in the 100-300 MHz frequency range.

As is understood by a person skilled in the art, the preferred embodiments of the present invention are illustrative of the present invention rather than limiting of the present invention. Revisions and modifications may be made to methods, materials, structures and dimensions employed in the present method for eliminating noise and cross-talk and protecting a CPP GMR or TMR read head from electrostatic discharge (ESD) damage using a resistive/capacitative shunt, while still providing a method for eliminating noise and cross-talk and protecting a CPP GMR or TMR read head from 99 electrostatic discharge (ESD) damage using a resistive/capacitative shunt, in accord with the spirit and scope of the present invention as defined by the appended claims.

What is claimed is:
1. A grounded, slider mounted CPP GMR or TMR read head protected from noise, cross-talk and electrostatic discharge (ESD) damage comprising:
  a substrate;
  a slider mounted magnetic read/write transducer formed on said substrate, said transducer being encapsulated in a dielectric medium and said transducer including a CPP GMR or TMR read head sensor and an inductive writehead having a lower pole adjacent to said read head sensor and there being a protective upper shield and a protective lower shield disposed about said read head sensor wherein said upper shield is between said lower pole and said read head sensor and is separated by said dielectric medium from said lower pole and wherein said lower shield is between said read head sensor and said substrate and is separated from said substrate by said dielectric medium and wherein said read head sensor has conductive leads providing connections for an output thereof to an input of a preamplifier having common-mode rejection circuitry;
  a resistive/capacitative shunt formed between said read/write transducer and said substrate wherein said shunt includes at least one electrical connection having a low resistance that is less than approximately 100Ω between said substrate and said lower pole, and includes highly resistive connections that are between approximately 1 and 100 kilo Ω between said substrate and said upper shield and between said substrate and said lower shield and further includes balanced capacitances formed between said lower pole and said upper shield, and between said lower shield and said substrate and wherein said substrate is grounded.

2. The device of claim 1 wherein the resistive/capacitative shunt includes a direct or low resistance connection of less than approximately 100 Ohms between the lower pole and substrate and equal high resistance electrical connections of between approximately 1 and 100 kiloOhms between said upper and lower shields and the substrate and wherein said shunt includes balanced capacitances formed between the pole and upper shield-and the lower shield and the substrate.

3. The device of claim 1 wherein said capacitances are balanced by forming said upper shield, said lower shield and said lower pole with equal surface areas, by separating said upper shield from said lower pole by a distance $t_3$, separating said lower shield from said substrate by a distance $t_1$, where $t_1$ and $t_3$ are equal and by forming layers of the same dielectric material between said lower pole and said upper shield and between said lower shield and said substrate.

4. The device of claim 1 wherein the capacitances are balanced by forming said upper shield, said lower shield and said lower pole with such surface areas and with such thicknesses of the dielectric layers between them that the ratios of surface area to dielectric layer thickness are the same.

* * * * *